June 17, 1947.    V. R. EDGAR    2,422,187
BRAKE MECHANISM
Filed Aug. 6, 1945    2 Sheets-Sheet 1

INVENTOR
Victor R. Edgar
BY Carlson, Pitzner, Hubbard & Wolfe
ATTORNEYS

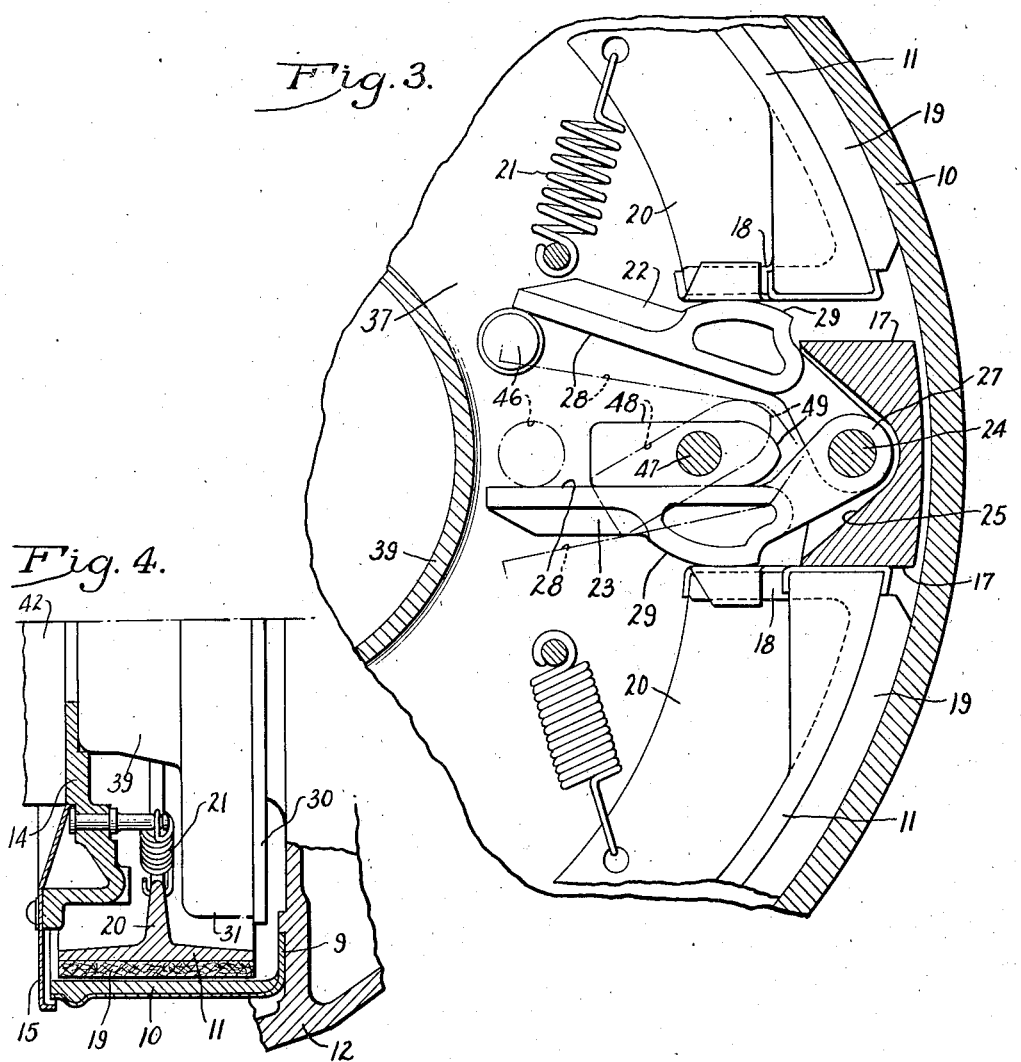

Patented June 17, 1947

2,422,187

UNITED STATES PATENT OFFICE 2,422,187

BRAKE MECHANISM

Victor R. Edgar, Rockton, Ill., assignor to Warner Electric Brake Manufacturing Company, South Beloit, Ill., a corporation of Illinois Application August 6, 1945, Serial No. 609,293

5 Claims. (Cl. 188—106)

This invention relates to a brake mechanism of the internal expanding type, and the primary object is to provide a novel expanding mechanism which enables the friction element to be expanded against the drum by a plurality of actuators.

A more detailed object is to provide for expansion of the friction element by the selective actuation of one of two crank arms which may be spread apart by an auxiliary cam actuator to apply the brake for emergency or parking purposes.

Other objects and advantages of the invention will become apparent from the following detailed description taken in connection with the accompanying drawings, in which Figures 1 and 2 are sectional views of a brake embodying the present invention and taken respectively along the lines 1—1 and 2—2 of Figs. 2 and 1.

Fig. 3 is an enlarged view of a part of Fig. 1 showing the actuated positions of the brake parts.

Fig. 4 is a fragmentary section taken along the line 4—4 of Fig. 1.

Figure 1:
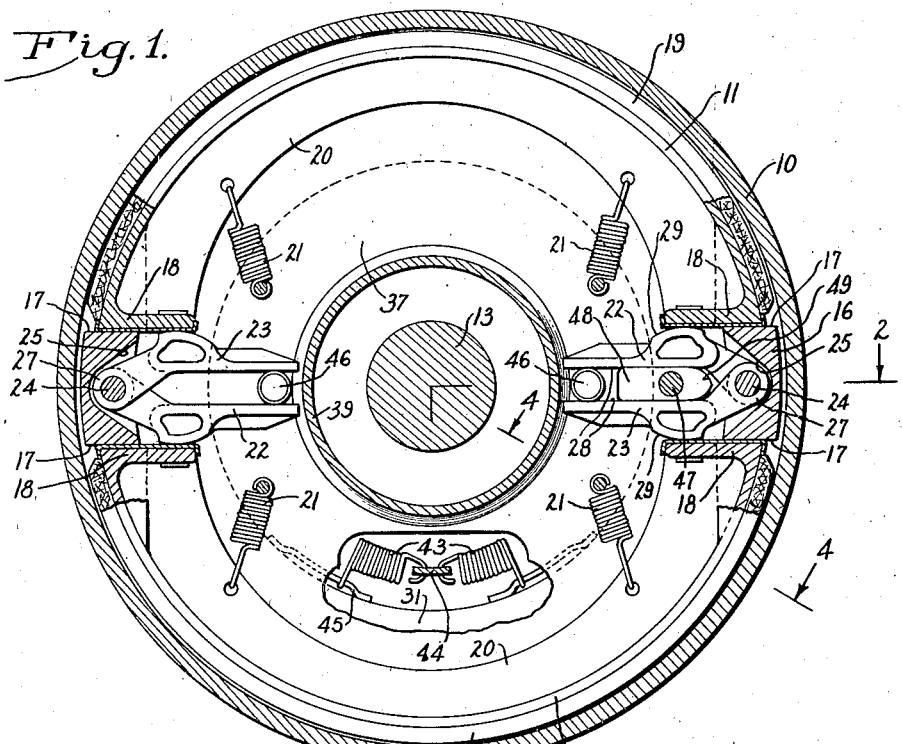
Figure 2:
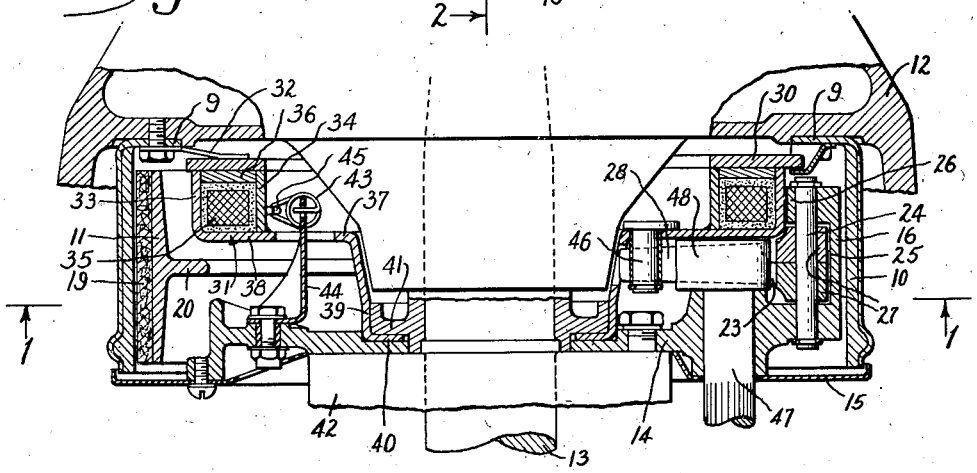

The exemplary brake shown in the drawings is adapted to be mounted within a drum 10 for radial expansion of its friction elements herein shown as semicircular shoes 11 into gripping engagement with the internal drum surface. An inturned flange 9 at one end of the drum is bolted to one side of a vehicle wheel 12.

Fast on the vehicle axle 13 or other nonrotatable part of the brake is a casting 14 carrying a sheet metal plate 15 closing the open end of the drum. Lugs 16 project into the drum on diametrically opposite sides of the anchor casting, and each provides oppositely facing parallel surfaces 17 spaced apart circumferentially and constituting abutment anchors for two of the inturned ends 18 of the shoes 11. The latter are covered with friction material 19 and cast with reinforcing ribs 20 which back the shoe ends 18. Springs 21 stretched between the anchor casting 14 and the ribs 20 normally contract the shoes away from the drum and hold their ends against the anchor 17.

The friction element formed by the shoes is expanded against the drum by actuation of one crank 22 or 23 of two pairs respectively disposed between the adjacent shoe ends 18 and projecting inwardly from pivot pins 24 that extend across inwardly facing recesses 25 between the casting 14 proper and inturned portions 26 of the anchor lugs 16. The cranks are duplicates having ends 27 which are offset laterally and disposed side by side on the pivot pin 24. The adjacent surfaces 28 of the cranks are straight and spaced a short distance apart in parallel relation in the brake-released positions of the parts. Intermediate their ends, the cranks bulge outwardly to form rounded cam surfaces 29 which are disposed adjacent or bear against the inner portions of the shoe ends 18. Thus, when either of the cranks is swung outwardly (see Fig. 3) away from the released position, the engaged shoe end will be moved circumferentially away from its anchor 17 to force the shoe against the drum.

Selective actuation of the cranks 22 and 23 according to the direction of drum rotation is effected in the present instance by an electromagnetic momentum type operator comprising two magnetic rings 30 and 31 mounted within the shoes and axially spaced from the shoe ribs toward the drum flange 9. The ring 30, which constitutes an armature for the magnet ring 31, is substantially flat and is supported from the flange 9 for yieldable axial floating movement. For this purpose, tangentially extending leaf springs 32 are secured at one end to the drum flange and at the other end to the back of the armature ring 30 at annularly spaced points. Suitable stop means (not shown) is provided to sustain the frictional torque applied to the armature when the latter is in a direction to compress the leaf springs. In addition to supporting the armature, these springs maintain the armature continuously in light mechanical contact with the face of the magnet 31.

The magnet is of U-shaped cross section having two concentric poles 33 and 34, an annular coil 35 between them, and segments 36 of friction material spanning the poles and flush with the end faces thereof. Herein, the magnet is formed by welding together in abutting relation a cylinder forming the inner pole 34 and a ring 37 of Z-shaped cross section having a flange forming the outer pole 33, and a flat annulus 38 against which the cylinder 34 abuts and is welded intermediate the margins of the former. At the inner margin of the annulus, the ring 37 is bent reversely to form a tubular projection 39 having an inturned flange 40 at its end. This flange is disposed between the casting 14 and the end of a collar 41 rigidly held between the axle flange and the wheel bearing. The collar provides a bearing for a portion of the tubular extension 39. The magnet is thus supported for oscillation about the wheel axis. Springs 43 act between a projection 44 on the anchor casting and eyes 45 on the magnet to hold the latter in normal brake-released position and return the same to this position when the coil 35 is deenergized.

Movement of the magnet in either direction away from brake-released position moves the corresponding ends of the shoes 11 away from the anchors 17 as shown in Fig. 3, the actuating forces being applied by the cam surfaces 29 to the flat abutment surfaces of the shoe ends which are disposed inwardly from the anchor. To accomplish this and at the same time amplify the force derived frictionally from the momentum of the moving vehicle, pins 46 project from the Z-shaped member 37 in between the flat surfaces 28 of the cranks and near the inner ends of the latter.

The brake being released, the parts will be positioned as shown in Fig. 1, all four shoe ends being drawn against their anchors 17 and the magnet 31 being correspondingly positioned. When the coil 35 is energized with the vehicle wheel turning counterclockwise, the magnet grips the rotating armature and turns therewith in the direction of drum rotation. The levers 22 are swung in the same direction moving the associated shoe ends away from the anchors, the other shoe ends remaining fixed against the anchors. These anchored ends are, however, free to shift outwardly along the anchor thereby permitting the full arc of the friction surface on the shoe to come into effective gripping engagement with the drum. After the clearance has been taken up and the shoes have been expanded against the drum, slippage occurs between the magnet and armature, the magnet being held frictionally in actuated position. When the magnet is deenergized, the parts are returned to their released positions by the springs 21 and 43. When the magnet is energized with the drum turning in the opposite direction, the cranks 23 are actuated by the magnet and the other ends of the shoes are moved away from their anchors.

An auxiliary acutator, acting through the medium of the cranks 22 and 23, is provided for expanding the friction element, such actuator preferably being operated manually for emergency or parking purposes. This actuator includes a rockshaft 47 journaled in and projecting through the casting 14 parallel to the drum axis with its inner end disposed between the surfaces 28 on one set of the cranks about midway between the anchor and actuator pins 24 and 46. Fast on the shaft is a third crank or cam 48 tapered as indicated at 49 at its outer end and having opposite parallel sides that project inwardly from the shaft. The outer end of the latter may be connected through suitable linkage to a hand lever or other suitable operating mechanism.

When the operating mechanism is in brake-released position, the cam 48 is disposed radially as shown in Fig. 1 and in this position does not interfere with the operation above described of the power operator. As the shaft is turned, one surface 49 engages the surface 28 on one of the cranks while the inner end of the cam engages the other surface 28 and the two cranks are spread apart moving both shoe ends away from their anchors and carrying the surfaces 28 to the positions shown in dot-dash outline in Fig. 3. The shoes thus pivot about the anchors at their other ends and both become effective in resisting turning of the drum. By arranging the auxiliary operator formed by the crank 48 to act indirectly through the intermediary of one of the cranks 22, 23, an exceedingly compact arrangement is provided so that the brake is well suited for use on vehicle wheels where the space available for the brake is limited.

I claim as my invention:

1. A friction brake mechanism having, in combination, an annular friction element having spaced ends circumferentially separable to expand said element, a nonrotatable member including an anchor disposed between said ends for abutting engagement with the latter, two cranks pivoted on said anchor and projecting inwardly toward the axis of said element and each swingable about an axis parallel to said axis, an operator for expanding said element including a member disposed between the inner ends of said cranks and movable about said element axis in either direction away from a normal brake-released position, a rockshaft journaled in said anchor member to turn about an axis extending parallel to said first mentioned axis between said cranks and spaced between said actuating member and said pivotal axis, and a cam fast on said rockshaft between said cranks and adapted when turned to spread the cranks apart and thereby expand said element.

2. A friction brake mechanism having, in combination, an annular friction element having adjacent ends separable to expand the element against a coacting drum surface, means providing abutment anchors for said ends, two crank members pivotally supported between said ends with their free ends projecting inwardly and lying side by side when said element is contracted against said anchors, operating means engageable with the inner end portions of said crank members and movable in one direction or the other away from brake-released position to actuate one or the other of the crank members and move the corresponding element end away from its anchor, and an auxiliary actuator mounted between said crank members to swing in the plane thereof and operable when actuated to spread the crank members apart.

3. A friction brake mechanism having, in combination, an annular friction element having adjacent ends separable to expand the element against a coacting drum surface, means providing abutment anchors for said ends, two crank members pivotally supported between said ends with their free ends projecting inwardly, a primary operating means adapted for abutting engagement with one or the other of said crank members and adapted when moved away from a normal brake-released position to move the engaged crank member and the corresponding element end to expand the element, a third crank member disposed between said first crank members for abutting engagement with one of the latter, and means by which said third crank member may be turned to expand said element through the medium of one of said first crank members.

4. A friction brake mechanism having, in combination, an annular friction element having adjacent ends separable to expand the element against a coacting drum surface, means providing abutment anchors for said ends, crank means mounted to swing about a fixed axis paralleling the axis of said element and operable to separate said element ends, primary means for actuating said crank means to expand said element, other crank means adapted to engage said first mentioned crank means and move the latter to expand said element, and actuating means for said other crank means.

5. A friction brake mechanism having, in combination, an annular friction element having adjacent ends separable to expand the element against a coacting drum surface, means providing abutment anchors for said ends, two crank members pivotally supported between said ends with their free ends projecting inwardly and lying side by side when said element is contracted against said anchors, operating means having abutting engagement with the inner end portions of said crank members for actuating the latter to expand said element, and auxiliary operating means having abutting engagement with said crank members intermediate their ends to actuate the same independently of said primary operating means.

VICTOR R. EDGAR.

REFERENCES CITED

The following references are of record in the file of this patent:

UNITED STATES PATENTS

| Number | Name | Date |
| --- | --- | --- |
| 2,051,088 | Kittle et al. | Aug. 18, 1936 |
| 2,372,319 | Francois | Mar. 27, 1945 |